United States Patent [19]

Tokuume

[11] Patent Number: 4,979,102
[45] Date of Patent: Dec. 18, 1990

[54] MICROPROCESSOR OPERABLE UNDER DIRECT CONNECTION TO COPROCESSOR

[75] Inventor: Takahiro Tokuume, Tokyo, Japan

[73] Assignee: NEC Corporation, Tokyo, Japan

[21] Appl. No.: 279,795

[22] Filed: Dec. 5, 1988

[30] Foreign Application Priority Data

Dec. 3, 1987 [JP] Japan .............................. 62-307165

[51] Int. Cl.$^5$ .............................................. G06F 15/16
[52] U.S. Cl. .............................. 364/200; 364/228.6; 364/229.2; 364/230.2
[58] Field of Search ... 364/200 MS File, 900 MS File

[56] References Cited

U.S. PATENT DOCUMENTS

| | | | |
|---|---|---|---|
| 4,395,758 | 7/1983 | Helenius | 364/200 |
| 4,509,116 | 4/1985 | Lackey et al. | 364/200 |
| 4,547,849 | 10/1985 | Louie et al. | 364/200 |
| 4,679,166 | 7/1987 | Berger et al. | 364/900 |
| 4,695,945 | 9/1987 | Irwin | 364/200 |
| 4,715,013 | 3/1987 | MacGregor et al. | 364/900 |

Primary Examiner—David Y. Eng

Attorney, Agent, or Firm—Foley & Lardner, Schwartz, Jeffery, Schwaab, Mack, Blumenthal & Evans

[57] ABSTRACT

A microprocessor to which a coprocessor can be connected includes a first terminal to be connected to the coprocessor to receive an operation request signal therefrom and a second terminal to be connected to the coprocessor to supply an operation-acknowledge signal thereto. A detection circuit detects an instruction to be executed by the coprocessor and produces a detection signal. A monitor circuit, responsive to the detection signal, monitors a level of the first terminal to produce an acknowledge signal when the first terminal is at an active level and an interrupt signal when the first terminal is at an inactive level. A circuit responsive to the acknowledge signal outputs the operation-acknowledge signal to the second terminal and a circuit responsive to the interrupt signal generates an interruption request signal to bring the microprocessor into an interruption operation. The microprocessor thereby performs the interruption operation in the absence of the coprocessor.

6 Claims, 4 Drawing Sheets

MICROPROCESSOR OPERABLE UNDER DIRECT CONNECTION TO COPROCESSOR

This application is related to copending applications 07/260,699, filed October 21, 1988, and entitled "Microcomputer System Including Master Processor and Slave Processor" and 07/119,601, filed November , 1987, and entitled "Micro Processor Capable of Being Connected With Coprocessor, now U.S. Pat. No. 4,926,318 issued May 15, 1990.

BACKGROUND OF THE INVENTION

The present invention relates to a microprocessor and, more particularly, to a microprocessor to which a coprocessor can be connected for co-operation.

In a microprocessor formed on a single semiconductor chip, there is a limitation in the number of circuit elements which can be integrated in a single chip. Therefore, it is difficult to realize a single chip microprocessor that executes, at a high speed, high level instructions such as a floating-point arithmetic operation, a function arithmetic operation, etc. In order to solve this problem, a main microprocessor is made to co-operate with a coprocessor which executes the high level instructions for the main microprocessor.

However, a system is initially developed with the use of a microprocessor, and then its designer finds it necessary to use a coprocessor. Therefore, the system designer must first develop a program necessary for using one microprocessor. Thereafter, when the coprocessor is necessitated, the designer amends the program so as to fit with the system using both the microprocessor and coprocessor. Thus, the system designer or the user of the microprocessor is required to form the program for using the coprocessor twice.

SUMMARY OF THE INVENTION

Therefore, an object of the present invention is to provide a microprocessor to which a coprocessor can be connected without changing a program to be executed Another object of the present invention is to provide a microprocessor having a function of detecting whether or not a coprocessor is connected thereto.

A microprocessor according to the present invention comprises a means for detecting whether or not an instruction to be supplied thereto is an instruction executed by a coprocessor and for producing a detection signal when the instruction is to be executed by the coprocessor, a first terminal to be supplied with an operation request signal having active and inactive levels from the coprocessor, a second terminal from which an operation-acknowledge signal is to be supplied to the coprocessor, means coupled to the first terminal and responsive to the detection signal for monitoring a level of the operation request signal to produce a first signal when the operation request signal takes the active level and a second signal when the operation request signal takes the inactive level, means coupled to the second terminal and responsive to the first signal for outputting the operation-acknowledge signal to the first terminal, and means responsive to the second signal for generating an internal interruption request to bring the microprocessor into an interruption operation.

Thus, this microprocessor has a function of judging whether or not the coprocessor is connected thereto. The microprocessor is brought into an interruption operation, in response to the judgement that the coprocessor is not connected. Accordingly, instructions to be executed by the coprocessor may be placed in a main processing routine in a program together with instructions executed by microprocessor, and instructions to be executed by the microprocessor due to absence of the coprocessor are placed in an interruption routine in the same program. A program including both these main and interruption routines can be prepared or written out at one time.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENT

Figure 1:
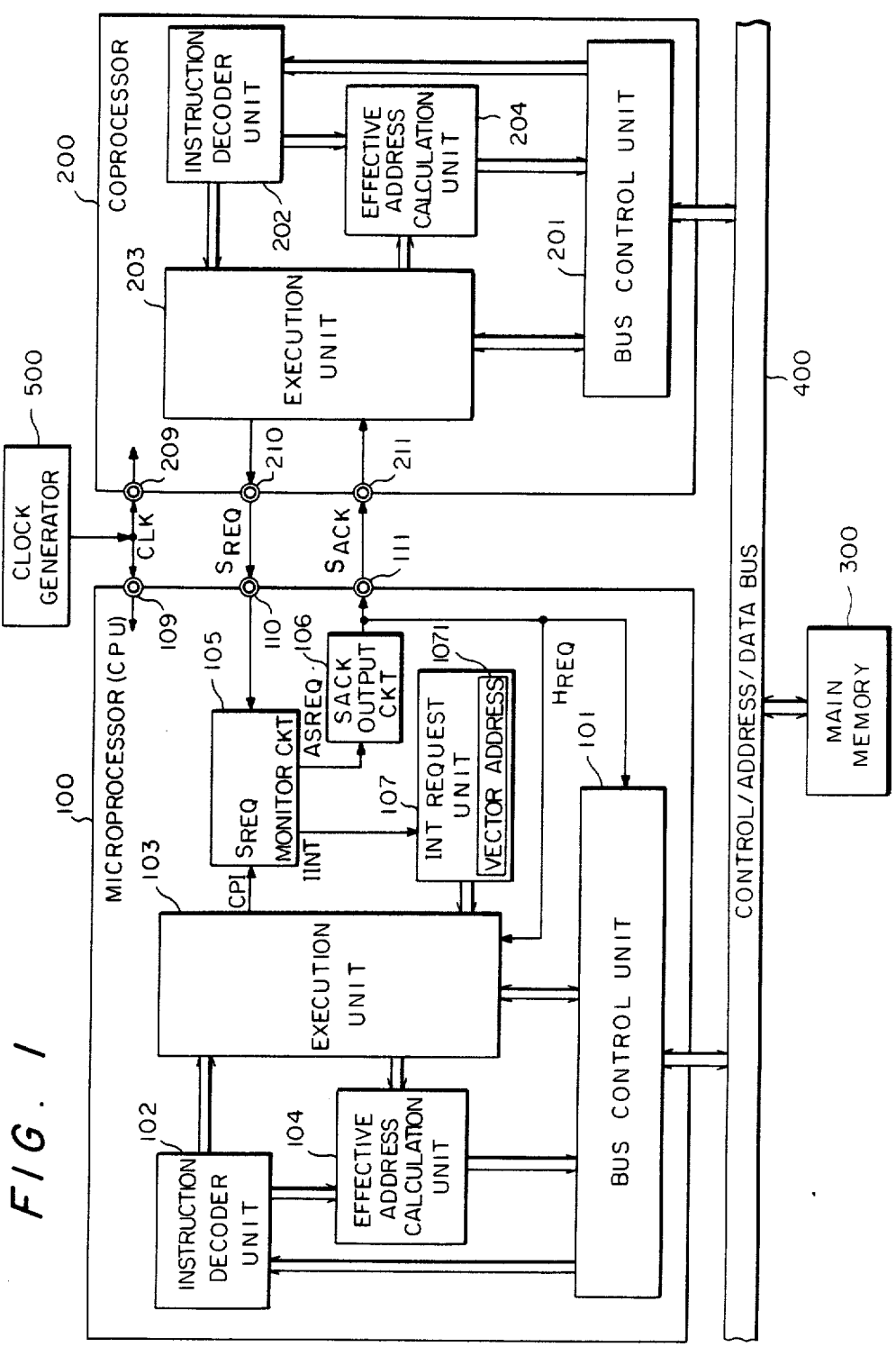
FIG. 1 is a block diagram representative of a microcomputer system including a microprocessor according to an embodiment of the present invention.

Referring to FIG. 1, a microprocessor or a central processing unit (CPU) 100 according to an embodiment of the present invention is connected to a coprocessor 200 and a main memory 300 via a control/address/data bus 400. The microprocessor 100 and the coprocessor 200 are fabricated on different semiconductor chips, respectively, and have clock input terminals 109 and 209, respectively, to which a clock signal CLK is applied in common from a clock generator 500 to synchronize their operations with each other.

The microprocessor (CPU) 100 includes a bus control unit 101 controlling a bus cycle of the control/address-/data bus 400, an instruction decoder unit 102 decoding an instruction supplied thereto from the unit 101 and producing decoded signals, an execution unit 103 executing the instruction in response to the decoded signals from the unit 102, and an effective address calculation unit 104 calculating an effective address of an operand or data address and/or an instruction address to be executed, which are coupled to one another as shown. In accordance with the present invention, the microprocessor 100 further includes a first terminal 110 supplied with an operation request signal $S_{REQ}$ from the coprocessor 200, a second terminal 111 from which an operation-acknowledge signal $S_{ACK}$ is outputted to the coprocessor 200, an $S_{REQ}$ signal monitor circuit 105 monitoring the level of the signal $S_{REQ}$, an $S_{ACK}$ signal output circuit 106, and internal interruption request unit 107, which will be described in detail later. The unit 107 includes a register 1071 storing a vector address representative of a leading address of an interruption program routine.

The coprocessor 200 includes a bus control unit 201 for controlling the control/address/data bus 400 when the operation thereof is enabled, an instruction decoder unit 202 decoding an instruction supplied thereto and producing the decoded signals, an execution unit 203 receiving the decoded signals from the unit 202, an effective address calculation unit 204 calculating an effective address of an operand or data address, and terminals 210 and 211. In response to the decoded signals from the decoder unit 202, the execution unit 203 judges whether or not the instruction to be executed by the coprocessor 200 is supplied thereto and produces the operation request signal $S_{REQ}$ to the terminal 210 when that instruction is judged to be executed by the coprocessor 200. In response to the operation-acknowledge signal $S_{ACK}$ supplied to the terminal 211 from the microprocessor 100, the execution unit 203 starts to execute the instruction.

The main memory 300 includes a program area storing a program to be executed and a data area storing operand data and/or result data. The program includes a main routine having instructions to executed by the microprocessor 100 and those to be executed by the coprocessor 200 and one or more interruption routines having instructions to be executed by the microprocessor 100 due to absence of the coprocessor 200.

Figure 2:
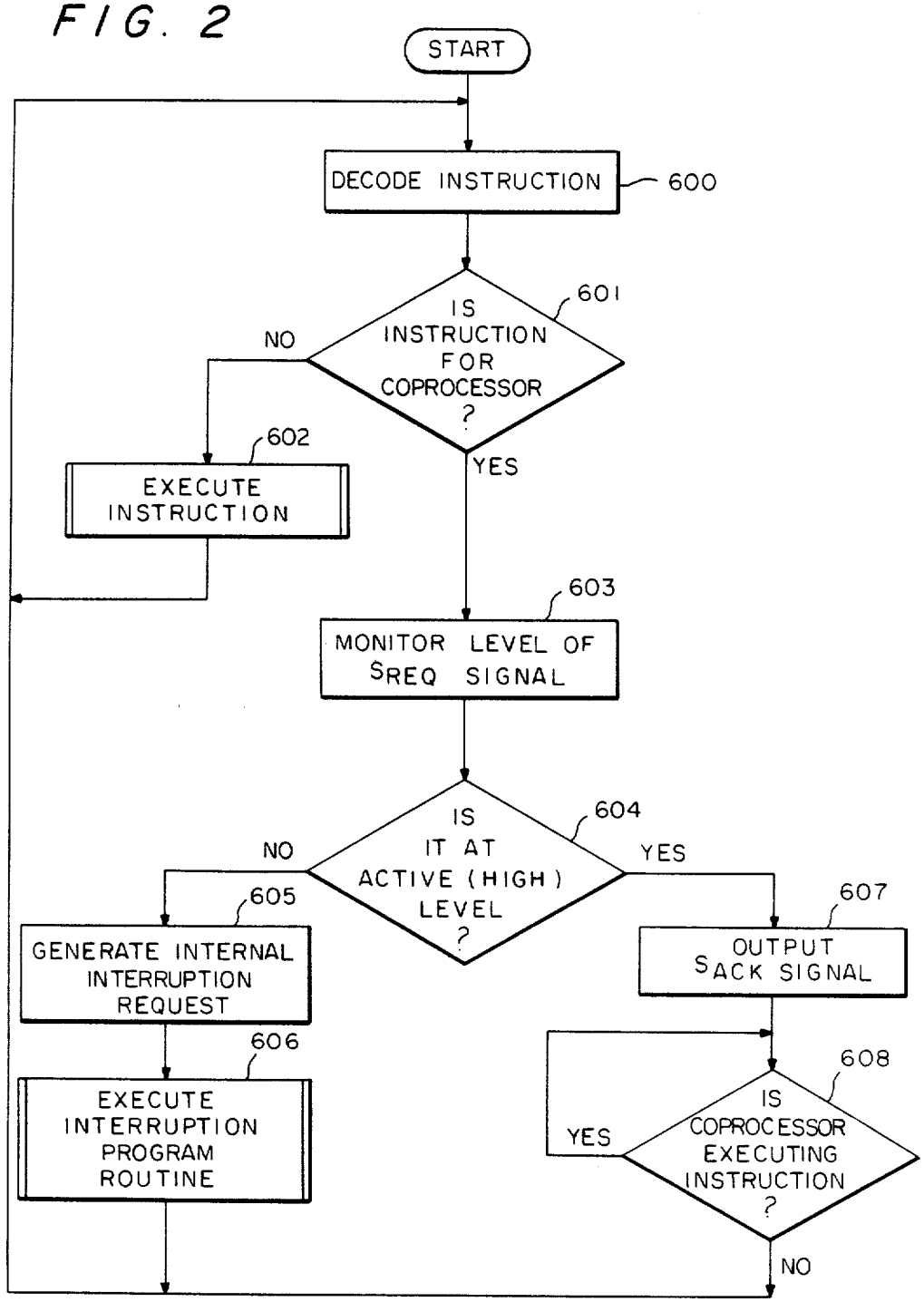
FIG. 2 is a flow chart representative of an operation of the microprocessor shown in FIG. 1.

Next, a circuit operation of the microprocessor 100 will be described below with reference also to FIG. 2. The program area of the main memory 300 is accessed only by the microprocessor 100, but an instruction read out of the address of the memory 300 thus accessed is supplied in common to the microprocessor 100 and the coprocessor 200. The instruction decoder unit 102 decodes the instruction supplied thereto via the bus control unit 101 and the bus 400 and produces the decoded signals (Step 600). In response to decoded signals, the execution unit 103 detects whether or not an instruction for the coprocessor 200 has been decoded (Step 601). When the instruction is detected to be executed by the microprocessor 100, the execution unit 103 executes the decoded instruction (Step 602) and returns to Step 600 to decode a next instruction. On the other hand, when the instruction is detected to be executed by the coprocessor 200, the execution unit 103 produces a detection signal CPI having a pulse shape. This signal CPI is supplied to the $S_{REQ}$ signal monitor circuit 105.

Figure 3:
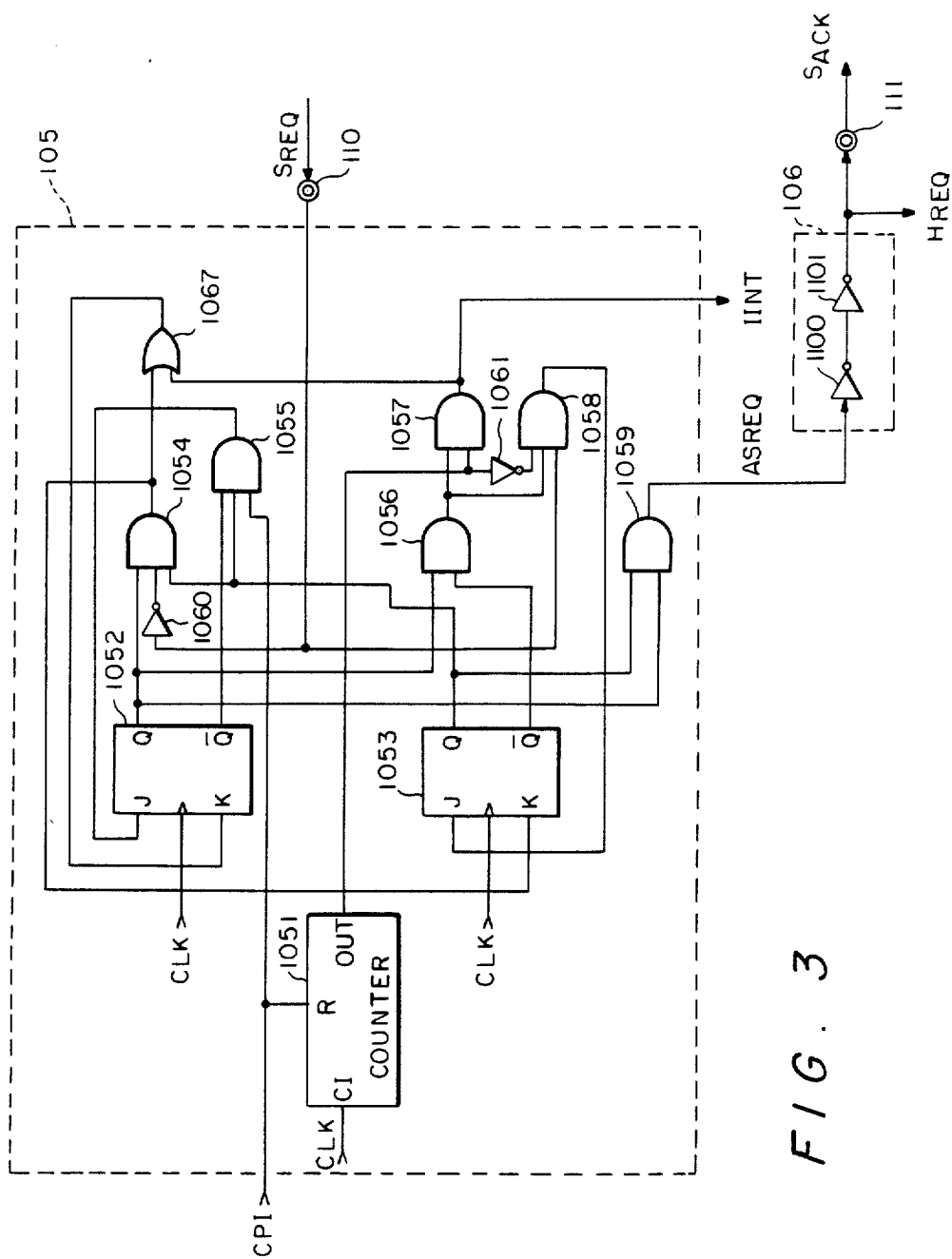
FIG. 3 is a circuit diagram representative of an $S_{REQ}$ signal monitor circuit and an $S_{ACK}$ signal output circuit shown in FIG. 1.
Figure 4A:
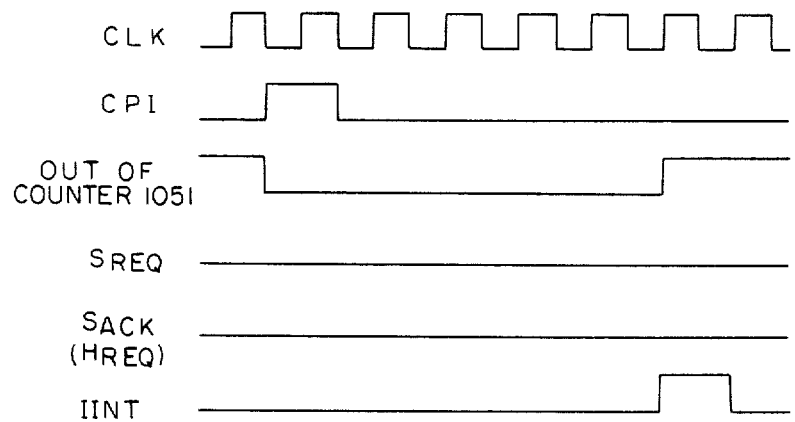
FIGS. 4a and 4b are timing charts representative of an operation of the monitor and output circuits shown in FIG. 3.
Figure 4B:
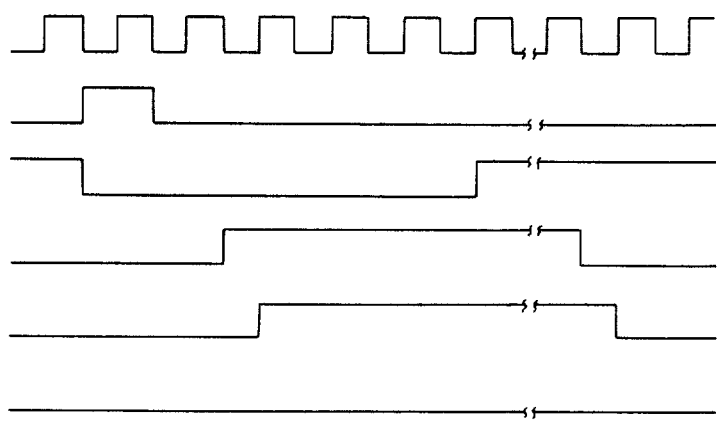

Referring to FIG. 3, the monitor circuit 105 includes a counter 1051, two JK flip-flops 1052 and 1053, six AND gates 1054 to 1059, two inverters 1060 and 1061 and one OR gate 1067, which are connected as shown. The Q outputs of the flip-flops 1052 and 1053 are at a low level in an initial state. In response to the signal CPI, the counter 1051 is brought into the reset state to change the output thereof to the low level, as shown in FIG. 4A, and the flip-flop 1052 is changed to a set state to produce a high level Q output in synchronism with the leading edge of the clock signal CLK. When the signal CPI changes to the low level, the counter 1051 starts a count operation and produces the high level output when it counts a predetermined number of pulses (four pulses in this embodiment) of the clock signal CLK. Unless the operation request signal $S_{REQ}$ supplied to the terminal 110 is changed to an active level (the high level in this embodiment) before the output of the counter 1051 is changed to the high level, the flip-flop 1053 holds the reset condition. Therefore, the AND gate 1057 produces an internal interruption request signal IINT in synchronism with the change of the output of the counter 1051 to the high level, as shown in FIG. 4A. On the other hand, when the signal $S_{REQ}$ takes the active level before the output of the counter 1051 is changed to the high level, as shown in FIG. 4B, the flip-flop 1053 is brought into a set state to produce the high level Q output. As a result, the AND gate 1059 produces a signal ASREQ representing that the signal $S_{REQ}$ is at the active level, and this signal ASREQ is supplied to the $S_{ACK}$ signal output circuit 106 which includes two inverters 1100 and 1101. Accordingly, the operation-acknowledge signal $S_{ACK}$ is produced and the internal interruption request signal IINT is not produced, as shown in FIG. 4B.

Turning back to FIGS. 1 and 2, the $S_{REQ}$ signal monitor circuit 105 responds to the signal CPI and monitors the level of the operation request signal $S_{REQ}$ to detect whether or not the signal $S_{REQ}$ is at the high level during a predetermined time period (Steps 603 and 604). It should be noted that the instruction read out of the memory 300 is supplied in common to the microprocessor 100 and the coprocessor 200. Accordingly, if the coprocessor 200 is connected to the microprocessor 100, the execution unit 203 of the coprocessor 200 also detects that the instruction to be executed by itself has been decoded in response to the signals from the decoder unit 202 and hence supplies the operation-request signal $S_{REQ}$ having an active level via the terminal 210 to the terminal 110 of the microprocessor 100. On the other hand, if the coprocessor 200 is not connected to the microprocessor 200, the terminal 110 is held at the low level, i.e. at the inactive level of the signal $S_{REQ}$. Assuming that the coprocessor 200 is not connected to the microprocessor 100, the $S_{REQ}$ signal monitor circuit 105 produces the internal interruption request signal IINT which is in turn supplied to the interruption request unit 107. In response to the signal IINT, the unit 107 supplies an interruption request to the execution unit 103 together with the vector address 1071 representative of the leading address of the interruption program routine (Step 605). As a result, the microprocessor 100 makes access to the main memory 300 to execute the interruption program routine including a string of instructions to be performed in the absence of the copressor 200 (Step 606). When the execution of the interruption program routine is completed, the executing state of the microprocessor 100 is returned to the main program routine to decode the next instruction (Step 600).

On the other hand, when the coprocessor 200 is connected to the microprocessor 100, the monitor circuit 105 produces the signal ASREQ which is in turn supplied to the $S_{ACK}$ circuit output signal 106. The operation-acknowledge signal $S_{ACK}$ is thereby outputted and supplied via the terminal 111 to the terminal 211 of the coprocessor 200 (Step 607). The operation-acknowledge signal $S_{ACK}$ is further supplied to the execution unit 103 and the bus control unit 101 as a hold request signal $H_{REQ}$, so that the microprocessor 100 is brought into a hold state (Step 608). The possession of the control/address/data bus 400 is thereby changed from the microprocessor 100 to the coprocessor 200. The execution unit 203 of the coprocessor 200 responds to the operation-acknowledge signal $S_{ACK}$ and starts the instruction execution. During the executing operation, the coprocessor 200 holds the operation request signal $S_{REQ}$ at the high level, as shown in FIG. 4B, so that the operation-acknowledge signal $S_{ACK}$ and accordingly the hold request signal $H_{REQ}$ is maintained at the high level. When the coprocessor 200 completes the instruction execution, the execution unit 203 thereof changes the signal $S_{REQ}$ to the low level, so that the flip-flops 1052 and 1053 (FIG. 4) are brought into the reset state. The operation-acknowledge signal $S_{ACK}$ and the hold request signal $H_{REQ}$ is thereby changed to the low level. As a result, the microprocessor 100 is released from the hold condition to decode the next instruction (Step 600).

As described above, the microprocessor 100 includes a function of detecting connection or non-connection of the coprocessor and is brought into the interruption routine executing state when the coprocessor is detected to be not connected. Therefore, the program stored in the main memory 300 is free from requiring change irrespective of the connection and non-connection of the coprocessor.

The present invention is not limited to the above embodiment, but may be changed and modified without departing from the scope and spirit of the invention. For example, the signal ASREQ can be employed as the hold request signal $H_{REQ}$ in place of the operation-acknowledge signal $S_{ACK}$.

What is claimed is:

1. A microprocessor for a system in which said microprocessor is interconnected via a bus with a coprocessor and a memory and in which an instruction read out of said memory is applied to and fetched by both said microprocessor and said coprocessor, said microprocessor comprising;

detection means for detecting whether or not an instruction supplied to and fetched by said microprocessor is an instruction to be executed by said coprocessor and for producing a detection signal when said instruction is to be executed to said coprocessor, a first terminal coupled to said coprocessor, said coprocessor supply said first terminal with an active level when said coprocessor receives and fetches an instruction to be executed by said coprocessor and with an inactive level when said coprocessor receives and fetches an instruction to be executed by said microprocessor, said first terminal being held at said inactive level when said coprocessor is absent from said system, a second terminal coupled to said coprocessor, monitor means, coupled to said detection means and to said first terminal and responsive to said detection signal, for monitoring a level of said first terminal and for producing a first signal when said first terminal is at said active level and a second signal when said first terminal is at said inactive level, output means, coupled to said monitor means and to said second terminal and responsive to said first signal, for outputting a third signal to said second terminal, said coprocessor starting to execute said instruction to be executed by said coprocessor in response to said third signal, and generation means, coupled to said monitor means and responsive to said second signal, for generating an interruption request signal which causes said microprocessor to execute an interruption program routine for processing in the absence of said coprocessor from said system.

2. A microprocessor as claimed in claim 1 further comprising hold means, responsive to one of said first and third signals, for causing said microprocessor to enter a hold condition.

3. A system comprising:

a microprocessor connected via a bus to a memory, and a coprocessor, said memory storing a program including a main program routine and an interruption program routine, said main program routine including a plurality of first type instructions to be executed by said microprocessor and at least one second type instruction to be executed by said coprocessor, said interruption program routine being used for processing in the absence of said coprocessor from said system and including a plurality of said first type instructions, said microprocessor comprising;

first and second terminals coupled to said coprocessor, reading means for reading instructions of said main program routine from said memory as a plurality of read-out instructions, each of said read-out instructions being supplied to and fetched by said microprocessor and said coprocessor in common, said coprocessor supplying said first terminal with a first logic level when a read-out instruction is said second type instruction and with a second logic level when said read-out instruction is said first type instruction, said first terminal being held at said second logic level when said coprocessor is absent from said system, execution means, coupled to said reading means, for decoding and executing said read-out instruction when said read-out instruction is said first type instruction, detection means, coupled to said reading means, for detecting that said read-out instruction is said second type instruction and for producing a detection signal, monitor means, coupled to said detection means and responsive to said detection signal, for monitoring a level of said first terminal and for producing a first signal when first terminal is at said first logic level and a second signal when said first terminal is at said second logic level, output means, coupled to said monitor means and responsive to said first signal, for outputting a control signal to said second terminal, said control signal causing said coprocessor to start to execute said read-out instruction of said second type of instruction, said microprocessor detecting said coprocessor changing said first terminal from said first logic level to said second logic level when execution of said second type instruction is completed, hold means, coupled to said monitor means and responsive to said first signal, for causing said reading means and said execution means to enter a hold condition[,]until said first terminal changes from said first logic level to said second logic level, and generation means, coupled to said monitor means and responsive to said second signal, for generating an interruption request signal, said execution means including interrupt means, responsive to said interruption request signal, for commanding said reading means to read instructions of said interruption program routine thereby causing said execution means to execute first type instructions of said interruption program routine.

4. A system as claimed in claim 3, wherein said coprocessor includes a decoder means for decoding said read-out instruction and for producing decoded information and second execution means coupled to said decoder means and to said first and second terminals, said second execution means having means responsive to said decoded information for supplying said first terminal with said first logic level when said second type instruction is decoded and with said second logic level when said first type instruction is decoded, means responsive to said control signal and to said decoded information for executing said second type instruction, and means for changing said first terminal from said first logic level to said second logic level when execution of said second type of instruction is completed.

5. A method of operating a microprocessor and a coprocessor comprising the steps of:

(a) supplying an instruction to both said microprocessor and said coprocessor;
(b) determining in said microprocessor whether or not said instruction is a type one instruction to be executed by said microprocessor or a type two instruction to be normally executed by said coprocessor;
(c) when said instruction is a type one instruction, executing said instruction in said microprocessor;
(d) when said instruction is a type two instruction, performing steps (1) through (4) below in said microprocessor;
   (1) producing a detection signal and supplying said detection signal to a circuit at a detection signal supply time;
   (2) determining whether a first signal is received in said circuit from said coprocessor within a predetermined period of time from said detection signal supply time;
   (3) generating an interrupt signal when said first signal is not received within said predetermined period of time, said interrupt signal causing a type two instruction to be executed in said microprocessor using a plurality of type one instructions; and
   (4) generating and transmitting to said coprocessor an acknowledge signal when said first signal is received within said predetermined period of time, said acknowledge signal causing microprocessor to enter a hold state and causing said coprocessor to execute a type two instruction.

6. A method of operating a microprocessor and a coprocessor as set forth in claim 5, further comprising the steps of:

determining in said coprocessor whether or not said instruction is a type one instruction or a type two instruction;
transmitting said first signal from said coprocessor to said microprocessor when said instruction is a type two instruction.

* * * * *